Patented July 22, 1930

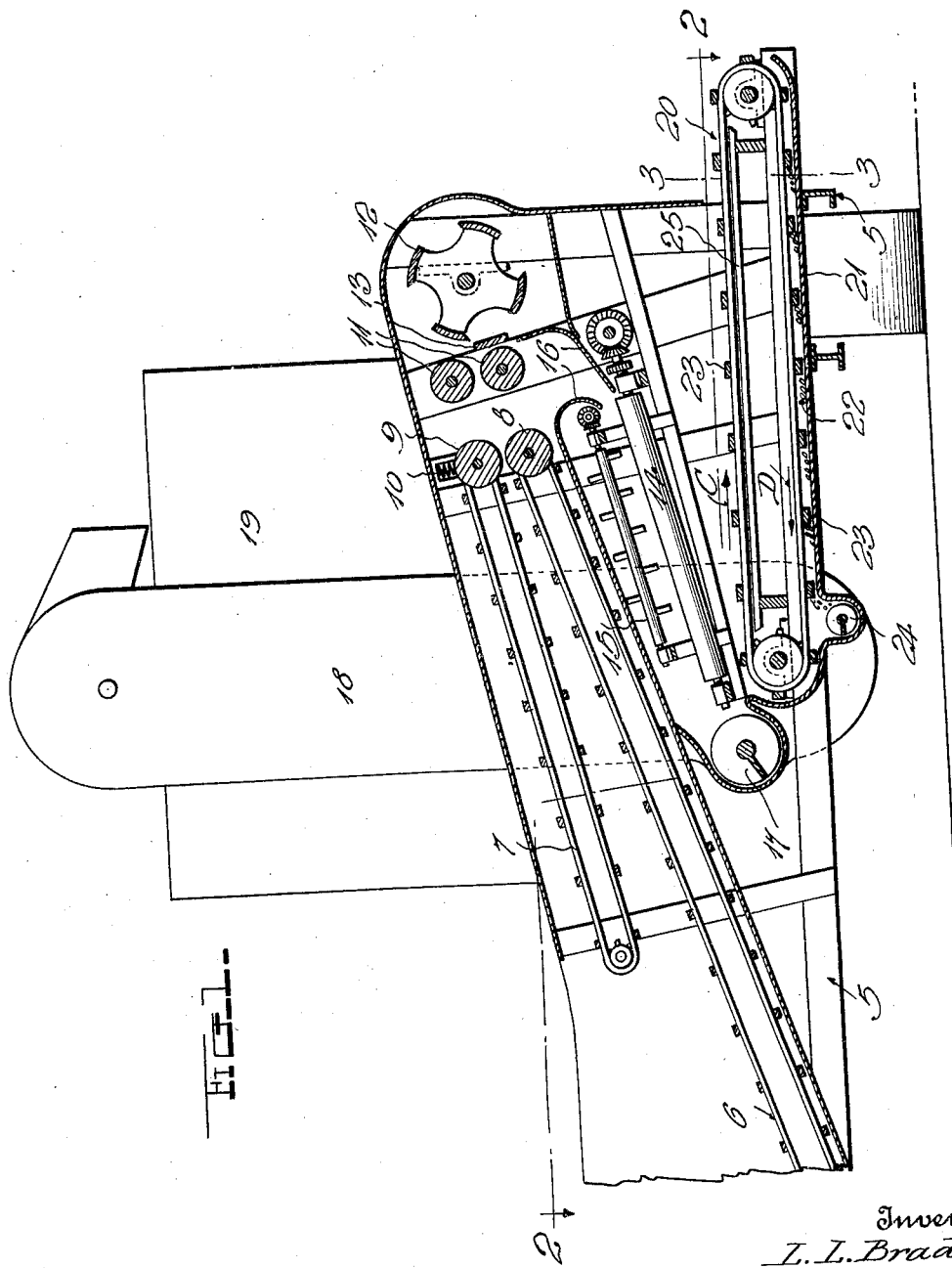

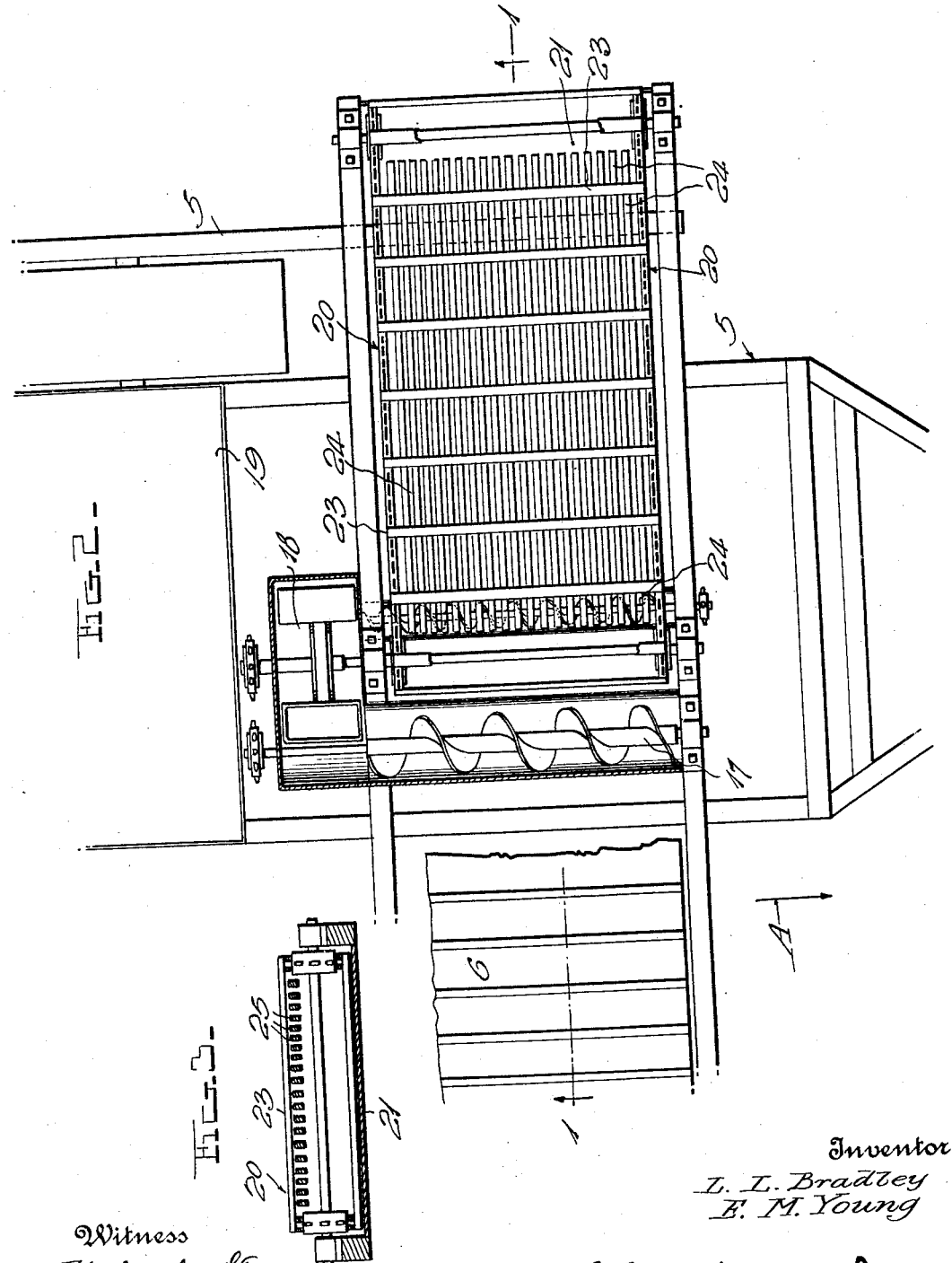

1,771,027

UNITED STATES PATENT OFFICE

LESLIE LEROY BRADLEY AND EUGENE MINER YOUNG, OF McLAUGHLIN, SOUTH DAKOTA

CORN HUSKER

Application filed August 30, 1928. Serial No. 303,051.

The invention relates to corn husking machines and the present disclosure is directed to a combined harvesting machine which conveys the cut stalks to ear-snapping rolls, presents the ears to husking rolls and the stalks to a shredder, conveys the husked corn to a receiver, carries the husks away from the husking rolls, and saves all corn loosened from the ears by the husking operation.

One object of the invention is to provide a comparatively simple and inexpensive machine of the class set forth which may be easily operated by one man.

A further aim is to provide an endless slatted husk-conveyor which conveys the husks as it travels in one direction and scrapes the loose grain from a receiving tray upon its return movement.

A further aim is to provide means whereby the loose corn scraped from the tray is conducted with the husked ears to the receiver.

With the foregoing in view, the invention resides in the novel subject matter hereinafter described and claimed, description being accomplished by reference to the accompanying drawings.

Fig. 1 is a vertical longitudinal sectional view substantially on line 1—1 of Fig. 2.

Fig. 2 is a horizontal sectional view on line 2—2 of Fig. 1.

Fig. 3 is a detail vertical section on line 3—3 of Fig. 1.

In the drawings above briefly described, the numeral 5 denotes a main wheeled frame for movement in the direction of the arrow A of Fig. 2. Mounted upon this frame and movable transversely thereof, is a conveyor 6 upon which cut stalks of corn are deposited by means forming no part of the present invention. This conveying means travels in the direction indicated by the arrow B in Fig. 1, and above its delivery end, is an auxiliary conveyor 7 which converges with the conveyor 6, toward the delivery point of the latter. At the discharge ends of the conveyors 6—7, relatively yieldable pressing rolls 8—9 are mounted, a portion of a spring mounting for the roll 9, being shown at 10 in Fig. 1. Beyond these pressing rolls, are two ear-snapping rolls 11 and beyond these rolls, is a shredder which may well consist of a rotary cutter 12 and a stationary cutter 13. The cut stalks are presented by the conveyors and the pressing rolls 8—9, to the snapping rolls 11. These snapping rolls remove the ears from the stalks and the latter pass on through the shredder. The shredded stalks may either be discharged into an appropriate receiver (not shown) or may be left in a row along the ground.

Below the delivery portion of the conveyor 6, are husking rolls 14, above which is an appropriate agitator 15, and appropriate means 16 are provided for guiding the ears onto said husking rolls, as they fall from the snapping rolls 11. The husking rolls 14 are inclined somewhat as usual, and at their lower ends is a husked ear-conveyor 17 which discharges into the lower end of an appropriate elevator 18, which elevator in turn delivers into a receiver 19 whose contents may be discharged from time to time by any desired means (not shown).

A husk conveyor 20 is mounted under the husking rolls 14 to receive the husks and any corn loosened from the ears incident to the husking operation. This conveyor 20 is of endless, slatted, openwork form, so as to permit all loose corn to fall through it onto a stationary pan 21 which is mounted in close relation with the lower reach of said conveyor. The upper reach of the conveyor 20 traveling in the direction of the arrow C of Fig. 1, carries the husks from the husking rolls and may either deposit them directly on the ground or into a receiver. The lower reach of conveyor 20 however, traveling in the direction indicated by the arrow D of Fig. 1, scrapes the loose corn 22 from the tray 21, due to the fact that the conveyor slats 23 are positioned to slide upon said tray. A conveyor 24 is provided parallel with the conveyor 17 and the loose corn is scraped into this conveyor by the slats 23. Conveyor 24 leads to the elevator 18 and hence this elevator handles both the loose corn and the husked ears of corn, all being discharged into the receiver 19.

The present application is not concerned with any particular driving means for any of the movable parts and no such driving means have been illustrated in detail nor described. These and various other mechanical details may be left to the skill of the manufacturer.

The machine as a whole is comparatively simple and inexpensive, yet is highly efficient for performing several operations simultaneously. Particular attention is invited to the twofold function of the endless conveyor 20, the upper reach of said conveyor serving to carry the husks from the husking rolls while the lower reach acts to scrape the loose corn from the tray 21 into the conveyor 24. Preferably, the upper reach of conveyor 20 travels over an appropriate slatted support 25 through which the husks cannot pass, although all loose corn may readily drop between the slats.

Excellent results may be obtained from the general structure shown and described, but it is to be understood that within the scope of the invention as claimed, numerous variations may be made.

We claim:

In a corn husker, husking means, an endless openwork husk conveyor under said husking means, a husked ear conveyor for laterally carrying the ears from the husking means, a tray under said husk conveyor to receive all loose corn falling therethrough from the husking means, said husk conveyor having transverse slats which while traveling in one direction convey the husks and upon return movement slide upon said tray to scrape the loose corn therefrom, a lateral loose corn conveyor into which the loose corn is scraped by said slats, an elevator into which said husked ear conveyor and said loose corn conveyor both discharge, and a receiver into which said elevator delivers.

In testimony whereof we have hereunto affixed our signatures.

LESLIE LEROY BRADLEY.
EUGENE MINER YOUNG.